United States Patent
Kettner et al.

(10) Patent No.: US 6,341,496 B1
(45) Date of Patent: Jan. 29, 2002

(54) ELECTRICALLY DRIVEN COMPRESSION-TYPE REFRIGERATION SYSTEM WITH SUPERCRITICAL PROCESS

(75) Inventors: Detlef Kettner, Bruhl; Hans-Martin Knaus, Speyer; Siegfried Reuter, Butzbach, all of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/570,762

(22) Filed: May 15, 2000

(30) Foreign Application Priority Data

May 16, 1999 (DE) .......................... 199 25 744

(51) Int. Cl.[7] .......................... F25B 41/04; F25B 31/02
(52) U.S. Cl. .......................... 62/225; 62/259.2; 62/505
(58) Field of Search .......................... 62/222, 223, 224, 62/225, 209, 210, 212, 505, 513, 113

(56) References Cited

U.S. PATENT DOCUMENTS

| | | | | |
|---|---|---|---|---|
| 2,797,554 A | * | 7/1957 | Donovan | 62/513 X |
| 3,388,559 A | * | 6/1968 | Johnson | 62/505 X |
| 3,407,623 A | * | 10/1968 | Richardson et al. | 62/505 X |
| 4,720,981 A | * | 1/1988 | Helt et al. | 62/513 X |
| 5,350,039 A | * | 9/1994 | Voss et al. | 62/505 X |

* cited by examiner

Primary Examiner—Harry B. Tanner
(74) Attorney, Agent, or Firm—Mayer, Brown & Platt

(57) ABSTRACT

It is proposed to design a compression-type refrigeration system of a motor-vehicle air-conditioning unit having a supercritical process, with a compressor (6), driven by an electric motor (5) with motor-control device (12), a gas cooler (27), an expansion member (8) and an evaporator (9) and also connecting elements for a circulation of a refrigerant, in such a way that the heat loss of the motor and/or of the motor-control device is essentially dissipated to the refrigerant. In particular, the refrigerant may flow around the motor and/or the motor-control device. This results in especially efficient cooling of the components, as a result of which their heat loss is reduced at the same time. Furthermore, in order to achieve a high efficiency of the entire unit, provision is made for the superheating of the refrigerant at the inlet of the compressor to be kept at a virtually constant level by a controlled expansion member.

11 Claims, 5 Drawing Sheets

ELECTRICALLY DRIVEN COMPRESSION-TYPE REFRIGERATION SYSTEM WITH SUPERCRITICAL PROCESS

BACKGROUND OF THE INVENTION

1. Field of the Invention

The invention relates to a compression-type refrigeration system of a motor-vehicle air-conditioning unit having a supercritical process, a refrigerant being circulated in the compression-type refrigeration system via refrigerant lines from a compressor via a gas cooler, an expansion member and an evaporator back to the compressor. Furthermore, the invention relates to a method of operating a corresponding compression-type refrigeration system.

2. Description of the Related Art

Compression-type refrigeration systems in modern motor-vehicle air-conditioning systems are directly driven by the internal combustion engine of the vehicle via a belt drive. As a result, the rotational speed of the compressor driven by the drive belt is directly related to the rotational speed of the internal combustion engine. However, the rotational speed of the internal combustion engine varies greatly under the various operating conditions of the vehicle. Thus, for example, a high rotational speed will prevail during high-speed expressway travel, whereas low revolutions will predominate during town travel or in particular also in a backup. Therefore it is precisely at slow speed, during which the required refrigerating capacity of the air-conditioning unit is greatest as a rule, that the lowest rotational-speed level is available. In order to ensure control of the refrigerating capacity in these units independently of the rotational speed of the internal combustion engine, these units have compressors with a variable swept volume. These compressors are, for example, so-called swash-plate compressors. These units have several disadvantages, such as, for example, the requisite increase in the idling speed of the internal combustion engine in order to prevent the same from stalling or the decrease in the volumetric efficiency when turning down the unit in a controlled manner on account of the back expansion volume related to the design. A decrease in the efficiency has an adverse effect in particular on the energy consumption.

In order to avoid the aforesaid disadvantages, electrically driven compression-type refrigeration systems for motor vehicles, such as, for example, in DE 37 31 360 A1, have already been proposed. In electrically driven compression-type refrigeration systems, the refrigerating capacity can be directly adapted to the value currently required for cooling the vehicle interior space. In particular, subsequent heating of the cooled air cannot occur. Electrically driven compression-type refrigeration systems therefore provide a good way of optimizing the primary energy input. However, additional problems are associated with the new type of drive. In particular, the problem of the generation of heat at the electric motor and of the motor control may be mentioned. It is therefore proposed in DE 37 31 360 A1 to sequentially override or disregard the comfort settings selected by the driver in order to avoid overloading of the electric motor. In other words, this means that the temperature at the electric motor is determined and the unit is turned down in a controlled manner if a critical limit value is reached. By this measure, however, a reduction in the refrigerating capacity will possibly be carried out precisely when a high refrigerating capacity is required. In addition, refrigeration systems with a supercritical process are not mentioned in DE 37 31 360 A1. The expression supercritical process is used when no gaseous/liquid phase transition takes place between the compressor outlet and the inlet of the expansion member. Such a supercritical process occurs, for example, when $CO_2$ is used as the refrigerant.

SUMMARY OF THE INVENTION

The object of the invention is therefore to specify a compression-type refrigeration system with a supercritical process in which said disadvantages are avoided and which at the same time has a high efficiency and thus a low primary energy input.

This object is achieved in a compression-type refrigeration system of the generic type in that the compressor is driven by an electric motor with motor-control device, and that the motor and/or the motor-control device is arranged in such a way that the dissipation of the heat loss of the motor and/or of the motor-control device is effected essentially via the refrigerant of the compression-type refrigeration system.

By the dissipation of the heat loss of the motor and/or of the motor-control device via the refrigerant, very efficient cooling of these elements is achieved. In the region between the outlet of the expansion member and the inlet of the compressor, the refrigerant has a temperature of only a few degrees Celsius. Both the temperature of the motor and the temperature of the motor-control device can therefore be reduced by the measure according to the invention to a temperature level at which the losses of the motor and of the motor-control device are substantially lower than at the high temperature levels which normally prevail in the engine compartment. Due to the low temperature level, the resistance of the motor windings, for example, is thus markedly reduced. The primary energy input may therefore already be reduced solely by the reduction in the operating temperature of the motor and/or of the motor-control device, since less heat loss occurs.

It was recognized that, due to the heat loss of the motor and/or of the motor-control device, this heat loss being supplied to the refrigerant, a decrease in the efficiency of the compression-type refrigeration system may occur in an otherwise unaltered complete system. By the supply of additional heat to the refrigerant, the superheating of the refrigerant at the inlet of the compressor can be increased. Furthermore, due to an increased compressor outlet temperature, the pressure and the specific enthalpy at the gas-cooler inlet are now increased, so that the efficiency of the unit decreases as a result of this process. In order to reliably avoid this undesirable effect, means for setting the superheating of the refrigerant at the compressor inlet are therefore also preferably provided. This achieves the effect that the superheating at the compressor inlet does not exceed the desired value. In particular, the absorption of the waste heat of the motor and/or of the motor-control device is taken into account in the process. To set the superheating at the compressor inlet, in particular a thermostatic expansion valve or an electronically controlled expansion valve may be provided. In this case, the superheating of the refrigerant at the compressor inlet is set by controlling the rate of flow through the valve and thus the refrigerant mass flow. At the same time, according to the invention, the reference superheating for the control of the expansion member is tapped directly at the compressor inlet. As a result, the effect of the waste heat of the motor and/or of the motor-control device is automatically taken into account.

In a preferred arrangement, the electric motor is accommodated together with the compressor in a common housing. This arrangement has the advantage that leakages at a rotating shaft, which may occur in an arrangement of the electric motor outside the compressor housing, are avoided from the beginning. In this case, especially effective cooling of the electric motor is achieved if the refrigerant flows directly around the electric motor. In a known embodiment, the electric motor 5 has a hollow shaft through which the refrigerant is conveyed from the refrigerant line to the compressor 6. In this known embodiment, the electric motor 5 is therefore cooled by the refrigerant at most to a small degree.

In order to achieve efficient cooling of the motor-control device, the latter is arranged in close thermal contact with the refrigerant, preferably in the region between the outlet of the expansion member and the inlet of the compressor, that is in the region of low refrigerant temperatures. In a special embodiment, the refrigerant flows directly around the motor-control device. However, it is also possible, for example, to arrange the motor-control device outside the refrigerant flow on the housing of the compressor or on the refrigerant lines in good thermal contact with the refrigerant.

The method according to the invention for operating a compression-type refrigeration system of a vehicle is based on a refrigeration system which has a compressor, driven by an electric motor with motor-control device, a gas cooler, a controllable expansion member and an evaporator, and also a refrigerant circulation with a refrigerant. Due to the known mode of operation of such a compression-type refrigeration system, the latter has regions with a low temperature level and a higher temperature level.

According to the invention, provision is now made for the electric motor or the motor-control device to be cooled by the refrigerant in the region of the low temperature level. Furthermore, provision is made for the rate of flow of refrigerant through the expansion member to be controlled in such a way that the refrigerant at the inlet of the compressor has virtually constant superheating. Energy-efficient operation of the compression-type refrigeration system is achieved by this procedure. The electric motor and/or the motor-control device works in a region having a reduced temperature level, so that reduced losses occur at these elements. At the same time, virtually constant superheating of the refrigerant is set at the inlet of the compressor. The temperature increase or superheating increase of the refrigerant due to the waste heat of the electric motor and/or of the motor-control device is taken into account by this procedure. In this case, the superheating at the compressor inlet is set in such a way that so-called liquid shocks in the compressor may be ruled out.

Liquid shocks in the compressor are produced by refrigerant which is not evaporated one hundred percent. A liquid portion present in the gaseous refrigerant is not compressible. On account of the highly dynamic compression operation and the inertia of the outlet valves, liquid shock may therefore occur in the compression space. This effect may lead to the failure of the compressor.

To avoid liquid shocks, the superheating of the refrigerant at the compressor inlet is selected in such a way that there is slight superheating of, for example, 5–15 K. Although a high value for the superheating is admissible per se, this has an adverse effect on the efficiency of the complete unit.

BRIEF DESCRIPTION OF THE DRAWINGS

The invention is explained in more detail below with reference to the drawing, in which.

DETAILED DESCRIPTION OF THE PREFERRED EMBODIMENTS

Figure 1:
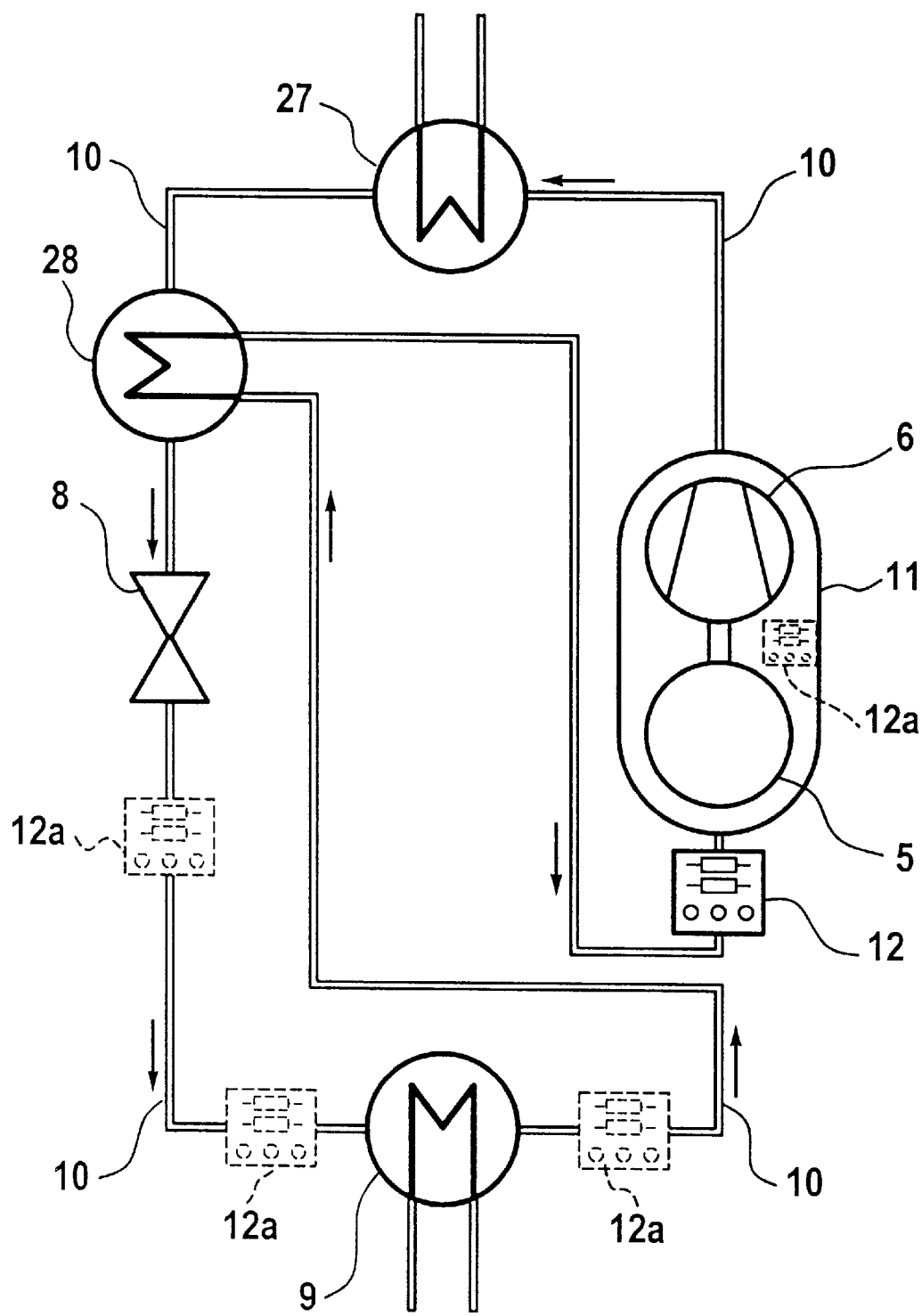
FIG. 1 shows a compression-type refrigeration system with electrically driven compressor and various installation locations of the motor-control device in the refrigerant circuit.

A compression-type refrigeration system according to the invention is shown schematically in FIG. 1. It has a compressor 6 driven by an electric motor 5. The compressor 6 may be in particular a rotary-vane compressor known per se. In particular, a continuous, low-pulsation delivery of a refrigerant (not shown) is achieved by means of a rotary-vane compressor. Furthermore, the refrigeration system has a gas cooler 27, a heat exchanger (inner heat exchanger) 28—unnecessary for the basic function of the refrigeration system—an expansion member 8 and an evaporator 9. The compressor 6, gas cooler 27, expansion member 8 and evaporator 9 are connected by means of refrigerant lines 10, so that a continuous circulation of a refrigerant from the compressor 6 via the gas cooler 27, the expansion member 8 and the evaporator 9 back to the compressor 6 is achieved.

The refrigerant is compressed in the compressor 6 and then fed to the gas cooler 27. In the gas cooler 27, heat is emitted to an external medium. The refrigerant remains in the gaseous state on account of the supercritical process. In the expansion member 8, the refrigerant is expanded and thus the pressure is decreased. The refrigerant is then present as wet vapor. The region from the compressor 6 via the gas cooler 27 up to the expansion member 8 forms the high-pressure side of the refrigeration system. The refrigerant expanded by the expansion member 8 enters the evaporator 9 and absorbs heat there from an external medium. Finally, the gaseous refrigerant is drawn in by the compressor 6 and the entire operation starts again. The region from the expansion member 8 via the evaporator 9 up to the inlet of the compressor 6 forms the low-pressure side of the refrigeration system. At the same time, this is also the region with a low temperature level, compared with the temperature level of the high-pressure side.

Due to the additional heat exchanger 28, which permits a heat exchange between the high-pressure side and the suction line to the compressor 6, an improvement in the overall refrigerating capacity of the system can be achieved.

In the embodiment shown in FIG. 1, the electric motor 5 and the compressor 6 are located in a common housing 11, and the refrigerant flows around the electric motor 5. Therefore very effective cooling of the electric motor 5 takes place by means of the refrigerant.

In a special embodiment of the invention, provision is now also made for the motor-control device 12 to also be in close thermal contact with the refrigerant. The style of the schematic representation in FIG. 1 is intended to indicate that the motor-control device 12 is located in the refrigerant circuit, i.e. the refrigerant flows around the motor-control device 12. As a result, optimum dissipation of the waste heat of the motor-control device is achieved. Various alternative installation positions 12a of the motor-control device within the refrigerant circuit are shown by broken lines in FIG. 1. In particular, the motor-control device together with the electric motor 5 and the compressor 6 may be accommodated in a common housing 11. Alternative mounting locations lie between the expansion member 8 and the evaporator 9, in the evaporator and between the evaporator 9 and the electric motor 5 or the compressor 6. Especially efficient cooling of the motor-control device 12 is achieved by the arrangement of the motor-control device 12 on the low-pressure side and thus also on the low-temperature side of the refrigerant circuit. In this region the refrigerant temperature is only a few degrees Celsius. On account of the markedly lower (compared with other embodiments) temperature level of the motor-control device 12, the losses which occur in the latter are also markedly lower. The reason for this is the lower heat loss of the components used in the motor-control device at a lower temperature level. The same effect also occurs at the electric motor 5, which is cooled to a lower temperature level by the refrigerant. In particular, the winding losses of the electric motor 5 are markedly lower than during operation at a high temperature level in the engine compartment of the motor vehicle.

Figure 2:
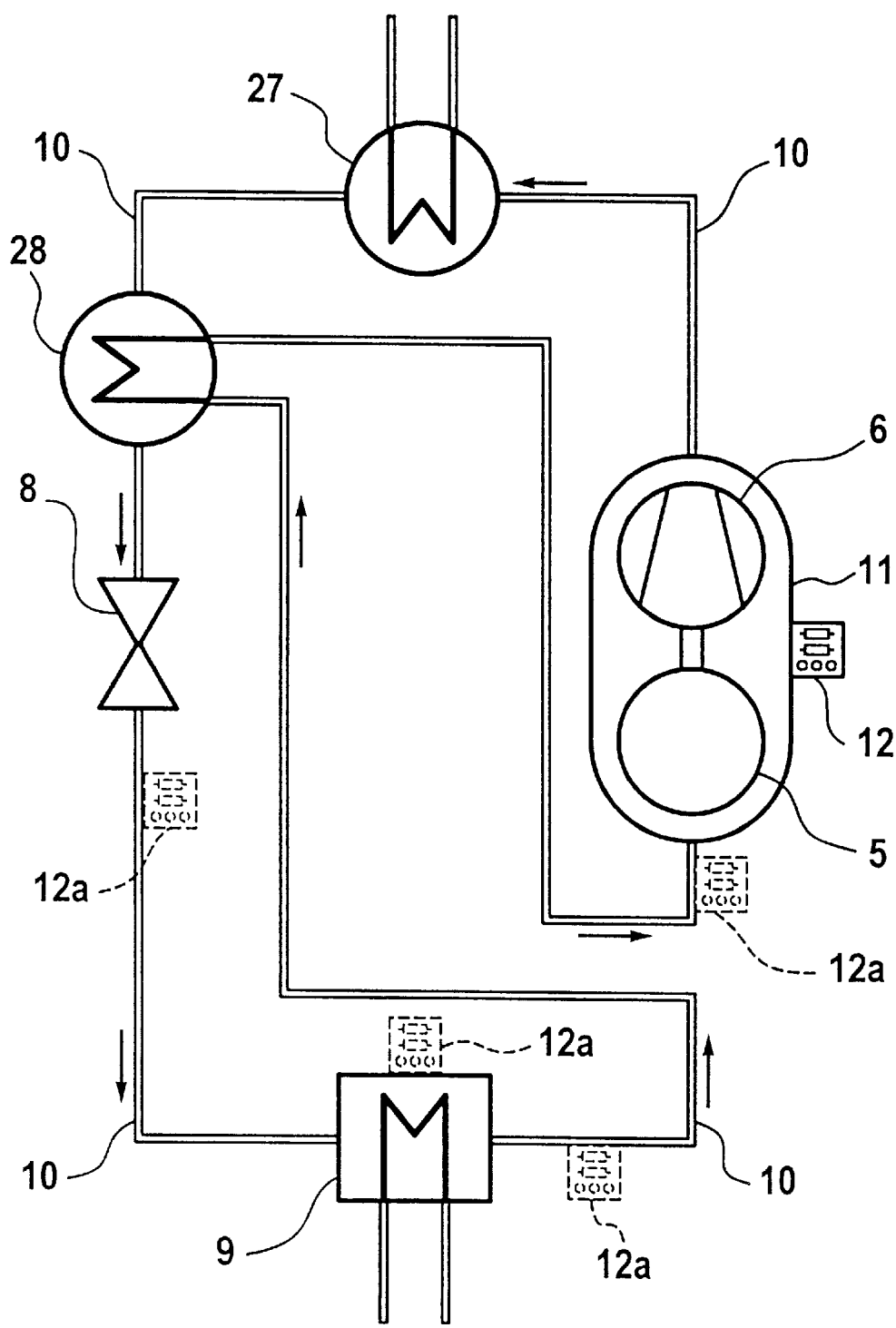
FIG. 2 shows a compression-type refrigeration system with electrically driven compressor and various installation locations of the motor-control device in thermally close contact with the refrigerant circuit but outside the same.

A further embodiment of the invention is shown in FIG. 2. Here, too, the electric motor 5 together with the compressor 6 is located in a common housing 11. The refrigerant preferably flows around and cools the electric motor. Unlike the embodiment in FIG. 1, however, the motor-control device 12 here is not directly included in the refrigerant circuit, but is in close thermal contact with the refrigerant without the latter flowing around it. Thus the motor-control device 12, for example, may be attached directly to the housing 11, the interior of the housing being filled with refrigerant. If the housing 11 is made of a metallic material, very good heat transfer takes place from the motor-control device 12 to the refrigerant inside the housing. This embodiment also achieves the effect that the motor-control device 12 is cooled essentially by the refrigerant. Alternative installation locations of the motor-control device are again shown by broken lines in FIG. 2. In particular, the motor-control device on the low-pressure side of the refrigeration system may be flange-mounted directly to a refrigerant line 10. Furthermore, installation of the motor-control device on the evaporator 9 is possible.

Due to the arrangement according to the invention of the motor-control device 12 and the electric motor 5 with cooling via the refrigerant, an additional heat quantity is admitted to the refrigerant on the low-pressure side. As a result, the superheating of the refrigerant at the inlet of the compressor 6 may thus lie at a higher level than in known refrigeration systems. If this appears to be undesirable from the energy point of view, a remedy may be provided by additional inventive measures described further below.

Figure 4:
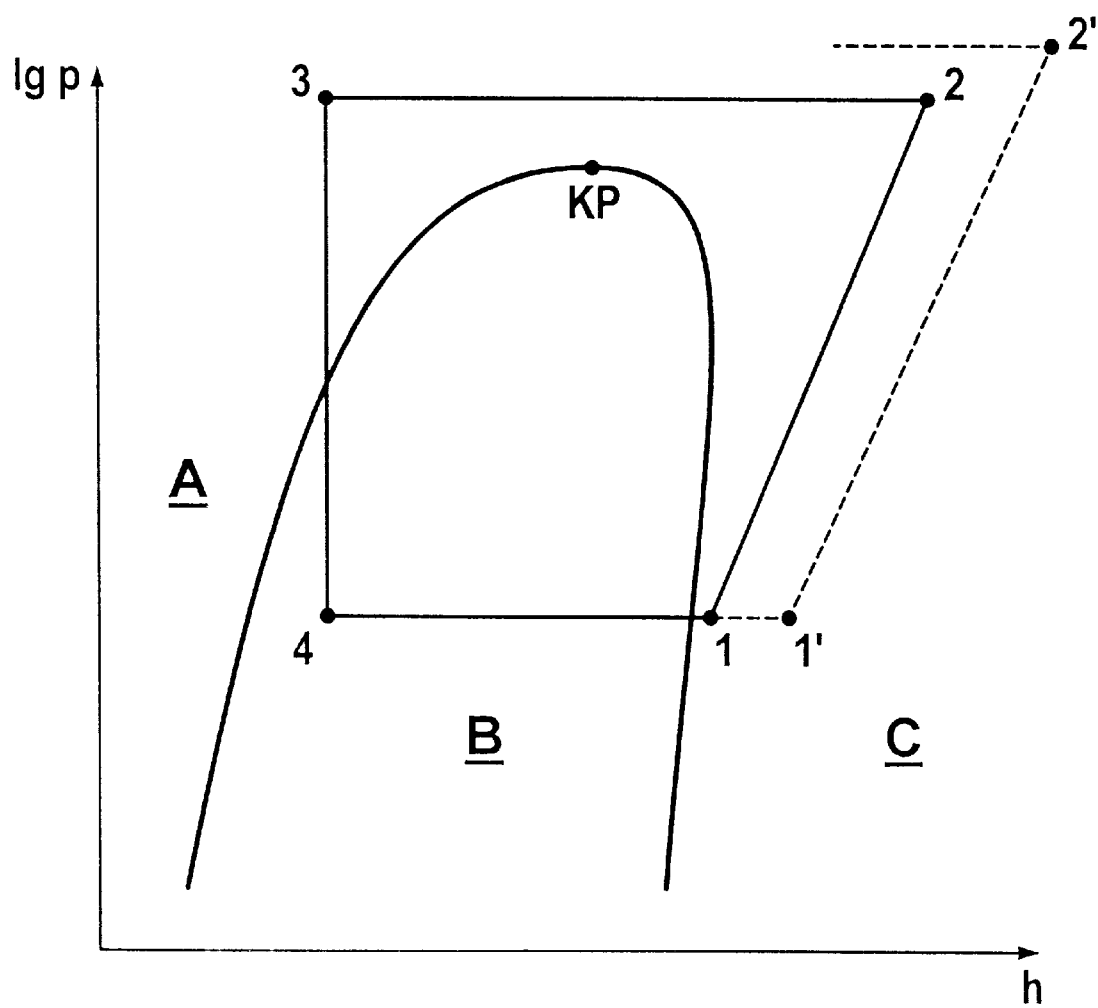
FIG. 4 shows a representation of the supercritical cyclic process taking place in the compression-type refrigeration system in the Mollier h, lg p diagram.

FIG. 4 shows a Mollier diagram containing the specific enthalpy h and the logarithm of the pressure p. For the refrigerant, three regions A, B, C are differentiated. The refrigerant is present in the liquid form in region A and in the gaseous form in region C. In region B, on the other hand, the refrigerant is present as so-called wet vapor, i.e. in the gaseous form with liquid droplets. The cyclic process taking place in the refrigeration system is plotted in the diagram of FIG. 4. In the diagram, according to the standardized method of designation, the compressor inlet is designated by 1, the compressor outlet by 2, the expansion-member inlet by 3 and the evaporator inlet or expansion-member outlet by 4. The transition between the compressor outlet and the expansion-member inlet (line 2–3) lies above the critical point KP, so that the refrigerant remains in the gaseous state.

Figure 3:
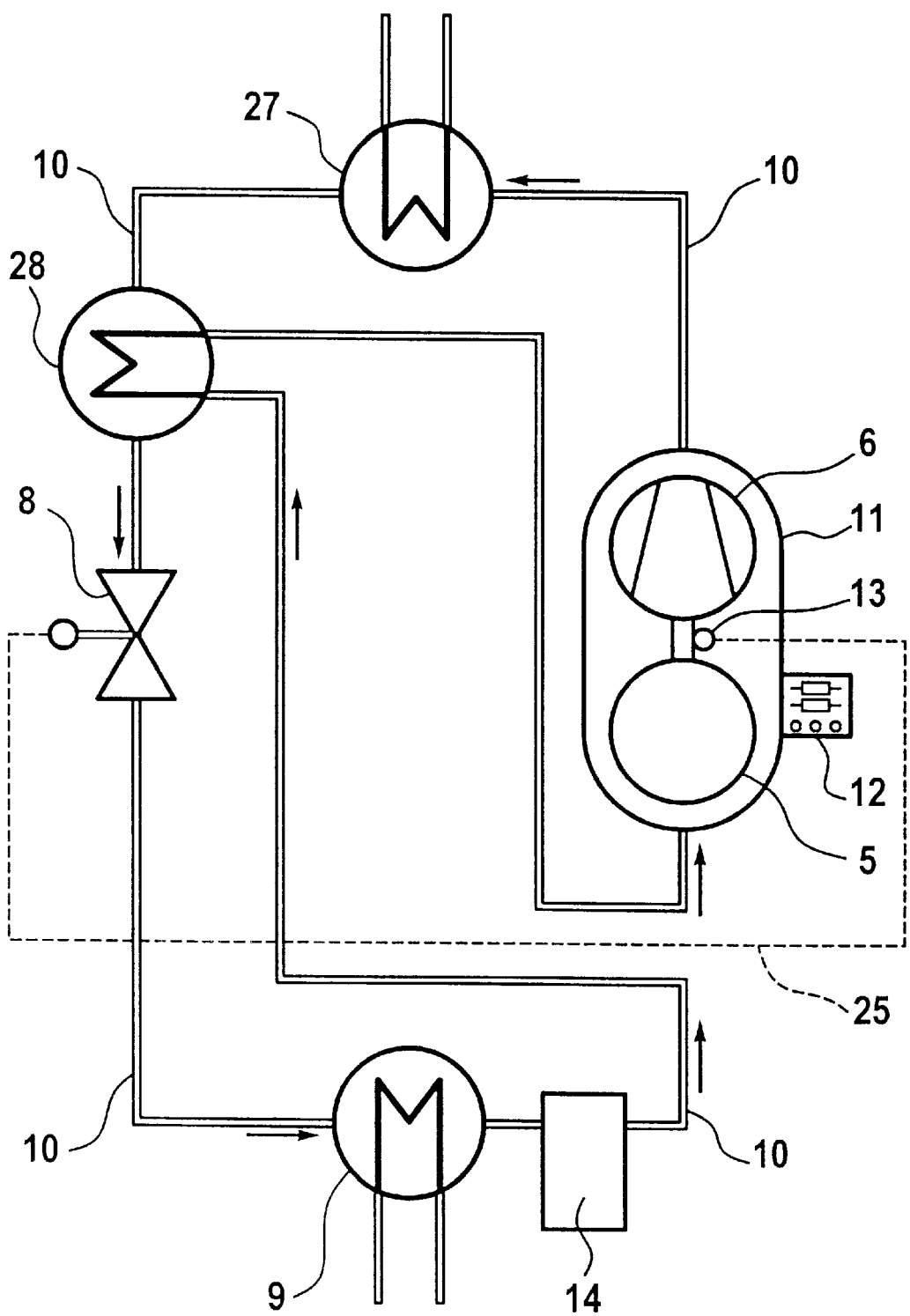
FIG. 3 shows a compression-type refrigeration system with electrically driven compressor, having means for setting the refrigerant superheating at the compressor inlet.

This is therefore termed a supercritical process, which occurs, for example, when $CO_2$ is used as the refrigerant. As already mentioned at the beginning, the superheating at the compressor inlet and thus also the specific enthalpy at point 1 are selected in such a way that the refrigerant contains no liquid droplets. In other words, this means that point 1 has to lie in region C. In known refrigeration systems, this is achieved by the superheating at the evaporator outlet being set to a virtually constant value. This is achieved by controlling the refrigerant quantity flowing through the expansion member 8. According to the present invention, depending on the mounting point of the motor-control device 12, a heat quantity depending on the current power loss of the motor-control device can be supplied to the refrigerant, so that a superheating increase and thus an enthalpy increase can occur at the inlet of the compressor 6. Point 1 may thus be displaced to point 1'. The compression of the refrigerant in the compressor 6 also results in a displacement of point 2 to point 2', i.e. there is a higher pressure at the compressor outlet. Such a possible displacement of the diagram of the cyclic process taking place results in a decrease in the efficiency of the refrigeration system. Such a possible decrease in the efficiency of the refrigeration system is reliably avoided by the further inventive design described below with reference to FIG. 3.

FIG. 3 again shows the refrigeration system with compressor 6, gas cooler 27, expansion member 8 and evaporator 9. In addition, a liquid separator 14 is provided between evaporator 9 and compressor 6. The compressor 6 is located together with the electric motor 5 in a common housing 11. The refrigerant flows directly around the electric motor 5. The motor-control device 12 is arranged on the housing 11 and in this way is likewise cooled by the refrigerant. By the waste heat of the electric motor 5 and the motor-control device 12, the specific enthalpy of the refrigerant is increased on its way from the evaporator 9 to the inlet of the compressor 6. So that there is favorable superheating in terms of energy at the inlet of the compressor 6, provision is now made for a temperature sensor 13 to be attached at the inlet of the compressor 6, this temperature sensor 13 being connected to the expansion member 8 via a sensor line 25. The refrigerant mass flow through the expansion member 8 is now controlled in such a way that virtually the identical desired superheating is always applied at the compressor inlet. The heat emission, varying with respect to time, of the motor-control device 12 and of the electric motor 5 to the refrigerant can thus be balanced. By selection of the optimum refrigerant parameters at the compressor inlet, a high efficiency of the refrigeration system with at the same time reliable operation without liquid shocks in the compressor 6 can thus be achieved. In addition, the efficiency of the entire system is further increased due to the reduction in the heat losses of the electric motor 5 and the motor-control device 12 on account of the lower temperature of these elements. Finally, there is also the optimum control of the refrigeration system as a function of the required refrigerating capacity due to the good controllability of the electric motor 5.

Figure 5:
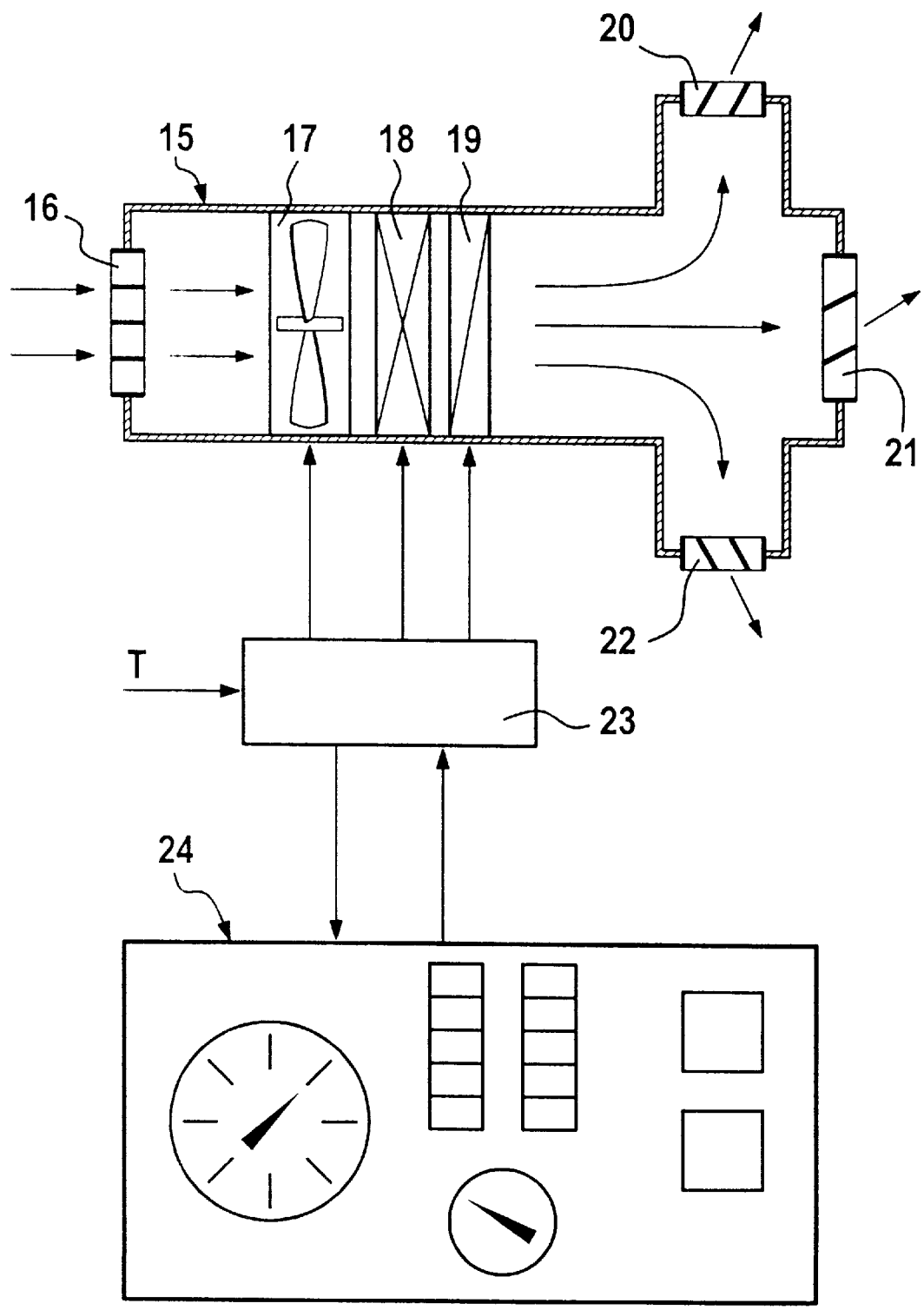
FIG. 5 shows a schematic representation of a heating and air-conditioning unit of a motor vehicle.

A ventilation and air-conditioning apparatus of a motor vehicle in which the compression-type refrigeration system described is used is shown schematically in FIG. 5. For the air feed into the interior space of the motor vehicle, the air-conditioning unit has an air duct 15, which directs the air from the air-inflow opening 16 by means of a blower 17 via the cooling device 18 and the heating device 19 to the outflow openings 20, 21, 22 into the interior space. The air-conditioning control is effected via the air-conditioning controller 23, which activates the blower 17, the cooling device 18 and the heating device 19. Input signals for the air-conditioning controller, in addition to the interior-space temperature T, which is measured by means of a temperature sensor, are also the setting variables which are selected via the operating elements of the operating unit 24. The cooling device 18 now contains the compression-type refrigeration system described above. In this case, the evaporator 9 of the compression-type refrigeration system is arranged in the air flow of the air duct 15. In the evaporator, the refrigerant therefore absorbs heat from the air drawn in in the air duct 15 and cools this air before it is fed to the vehicle interior space. The desired cooling effect on the vehicle interior space is thereby achieved.

What is claimed is:

1. A compression-type refrigeration system of a motor-vehicle air-conditioning unit having a supercritical process comprising:

a refrigerant for circulation in the compression-type refrigeration system via refrigerant lines;

a compressor;

a gas cooler;

an expansion member; and an evaporator;

wherein said refrigerant is circulated in a gaseous state via said refrigerant lines on a high-pressure side first from said compressor to said gas cooler, then to said expansion member, and on a low-pressure side from said expansion member to said evaporator, and back to the compressor; and further wherein the compressor is driven by an electric motor with motor-control device, and the motor and/or the motor-control device is arranged in such a way that the dissipation of the heat loss of the motor and/or of the motor-control device is effected essentially via the refrigerant of the compression-type refrigeration system.

2. The compression-type refrigeration system as claimed in claim 1, further comprising means for setting the superheating of the refrigerant at the compressor inlet.

3. The compression-type refrigeration system as claimed in claim 1, wherein the electric motor and the compressor are accommodated in a common housing.

4. The compression-type refrigeration system as claimed in claim 1, wherein the refrigerant flows around the electric motor.

5. The compression-type refrigeration system as claimed in claim 1, wherein the motor-control device is arranged in close thermal contact with the refrigerant between the outlet of the expansion member and the inlet of the compressor.

6. The compression-type refrigeration system as claimed in claim 5, wherein the refrigerant flows around the motor-control device.

7. The compression-type refrigeration system as claimed in claim 2, wherein the means for setting the superheating at the compressor inlet comprises a thermostatic expansion valve.

8. The compression-type refrigeration system as claimed in claim 2, wherein the means for setting the superheating at the compressor inlet comprises an electronically controlled expansion valve.

9. The compression-type refrigeration system as claimed in claim 1, wherein the refrigerant used is $CO_2$.

10. The compression-type refrigeration system as claimed in claim 1, further comprising a heat exchanger for the heat exchange between the high-pressure side and the low-pressure side of the refrigeration system.

11. A method of operating a compression-type refrigeration system of a motor vehicle comprising:

providing a compression-type refrigeration system for a motor vehicle comprising a compressor driven by an electric motor with motor-control device, a gas cooler, a controllable expansion member, an evaporator, and refrigerant lines from the compressor linking the gas cooler, the controllable expansion member and the evaporator back to the compressor and circulating a refrigerant in a gaseous state within said refrigerant lines, wherein said refrigerant, due to the mode of operation of the compression-type refrigeration system, has regions with a lower temperature level and a higher temperature level;

wherein the compression-type refrigeration system has a supercritical process, the electric motor and/or the motor-control device is cooled by the refrigerant of the compression-type refrigeration system in the region of the lower temperature level, and the rate of flow of refrigerant through the expansion member is controlled in such a way that the refrigerant at the inlet of the compressor has virtually constant superheating.

* * * * *